(12) United States Patent
Yue et al.

(10) Patent No.: US 7,003,936 B1
(45) Date of Patent: Feb. 28, 2006

(54) POWER LAWN MOWER

(75) Inventors: Jun-Hsiuing Yue, Kaohsiung (TW); Chun-Ching Chen, Feng Shan (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 10/972,360

(22) Filed: Oct. 26, 2004

(51) Int. Cl.
*A01D 69/00* (2006.01)

(52) U.S. Cl. ............................ 56/10.8; 123/198 DC
(58) Field of Classification Search .......... 123/198 DC
See application file for complete search history.

(56) References Cited

U.S. PATENT DOCUMENTS

| | | | | |
|---|---|---|---|---|
| 4,531,487 A | * | 7/1985 | Fujikawa et al. | 123/198 DC |
| 4,979,596 A | * | 12/1990 | Roller | 188/166 |
| 5,048,478 A | * | 9/1991 | Bonde et al. | 123/195 A |
| 5,224,448 A | * | 7/1993 | Kandler | 123/198 D |

* cited by examiner

Primary Examiner—Árpád Fábián Kovács
(74) Attorney, Agent, or Firm—Banner & Witcoff, Ltd.

(57) ABSTRACT

A power lawn mower includes a mower body, a driving device, and a brake device. The driving device is disposed on the mower body, and includes an engine and an electrical element unit. The brake device and the electrical element unit are located respectively at two opposite sides of an assembly of the engine and the flywheel.

4 Claims, 5 Drawing Sheets

POWER LAWN MOWER

BACKGROUND OF THE INVENTION

1. Field of the Invention

This invention relates to a lawn mower, and more particularly to a lawn mower that includes a brake device and an electrical element unit, which are located respectively at two opposite sides of an assembly of an engine and a flywheel to thereby increase the safety and heat-dissipating effect of the lawn mower.

2. Description of the Related Art

Referring to FIGS. 1 and 2, a conventional lawn mower 1 is shown to include an oil tank unit 11, an engine 12, an electrical element unit 13, a flywheel 14, and a brake device 15. The electrical element unit 13 includes a carburetor (not shown), a plug (not shown), and an electrical circuit (not shown).

The flywheel 14 rotates in a clockwise direction, and has a side surface 141 that is formed with a plurality of ribs 142, which are arranged such that the flywheel 14 functions as a fan for creating an air current therearound. Thus, an airflow path is formed around the flywheel 14 so as to allow for dissipation of heat from the engine 12 and the electrical element unit 13 in an air-cooling manner.

The brake device 15 includes a fixed seat 151, a braking arm 152 disposed pivotally on the fixed seat 151 at a position under the flywheel 14, a braking shoe 153 secured to the braking arm 152, a coiled tension spring 154 interconnecting the braking arm 152 and the fixed seat 151, a braking line unit 155 connected to the braking arm 152, and a power switch 156 for controlling the supply of electricity to the engine 12.

Referring to FIG. 1, when it is desired to use the lawn mower 1, a lever (not shown) mounted on a driving handle (not shown) of the lawn mower 1 is actuated against the biasing action of the spring 154 so that the braking line unit 155 displaces the braking arm 152 toward the power switch 156. Thereafter, the power switch 156 is activated by the braking arm 152 so that electricity is supplied to the engine 12. At the same time, the flywheel 14 is released from the brake device 15 so that it can rotate and drive the engine 12, thereby allowing for the grass-cutting operation of the lawn mower 1.

Subsequently, referring to FIG. 2, when it is desired to stop the grass-cutting operation of the lawn mower 1, the lever (not shown) on the driving handle (not shown) is released. This causes the braking arm 152 to be pulled away from the power switch 156 by the spring 154, thereby interrupting the supply of power from the power switch 156 to the engine 12. Furthermore, the braking shoe 153 presses against the flywheel 14 so as to stop the flywheel 14 and the engine 12.

The aforesaid conventional lawn mower 1 suffers from the following disadvantages:

(1) Because the brake device 15 is disposed adjacent to an upper stream side of the electrical element unit 13 and the engine 12, a turbulent airflow will form between the brake device 15 and the electrical element unit 13, and between the brake device 15 and the engine 12. As a result, the heat-dissipating effect is reduced. Although the fixed seat 151 and an air-guiding unit 16 can guide air into the annular airflow path, such a configuration increases the manufacturing cost of the lawn mower 1.

(2) When the braking shoe 153 of the brake device 15 contacts the flywheel 14, some sparks are inevitably produced therebetween. If the sparks reach the electrical element unit 13, this poses an explosion or fire hazard.

SUMMARY OF THE INVENTION

The object of this invention is to provide a power lawn mower that has an improved heat-dissipating effect.

According to this invention, a power lawn mower includes a mower body, a driving device, and a brake device. The driving device is disposed on the mower body, and includes an engine and an electrical element unit. The brake device and the electrical element unit are located respectively at two opposite sides of an assembly of the engine and the flywheel. As a consequence, the brake device is remote from the electrical element unit, and therefore the generation of a turbulent airflow between the brake device and the electrical element unit and between the brake device and the engine is prevented. Furthermore, sparks resulting from friction between the brake device and the flywheel cannot reach the electrical element unit. Thus, the safety and heat-dissipating effect of the lawn mower of this invention are promoted.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
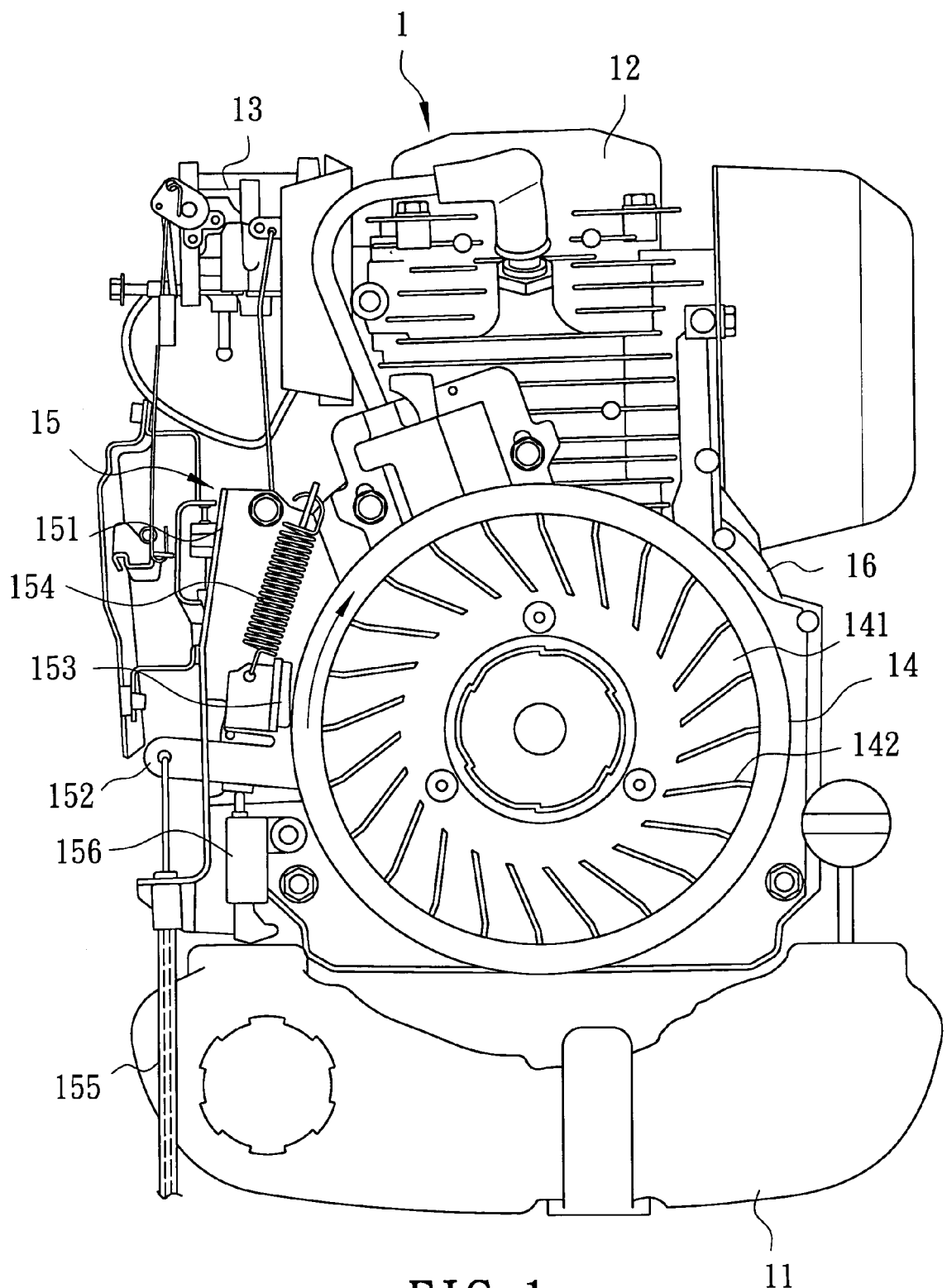
FIG. 1 is a schematic top view of a conventional lawn mower, illustrating how a flywheel is released from a brake device.
Figure 2:
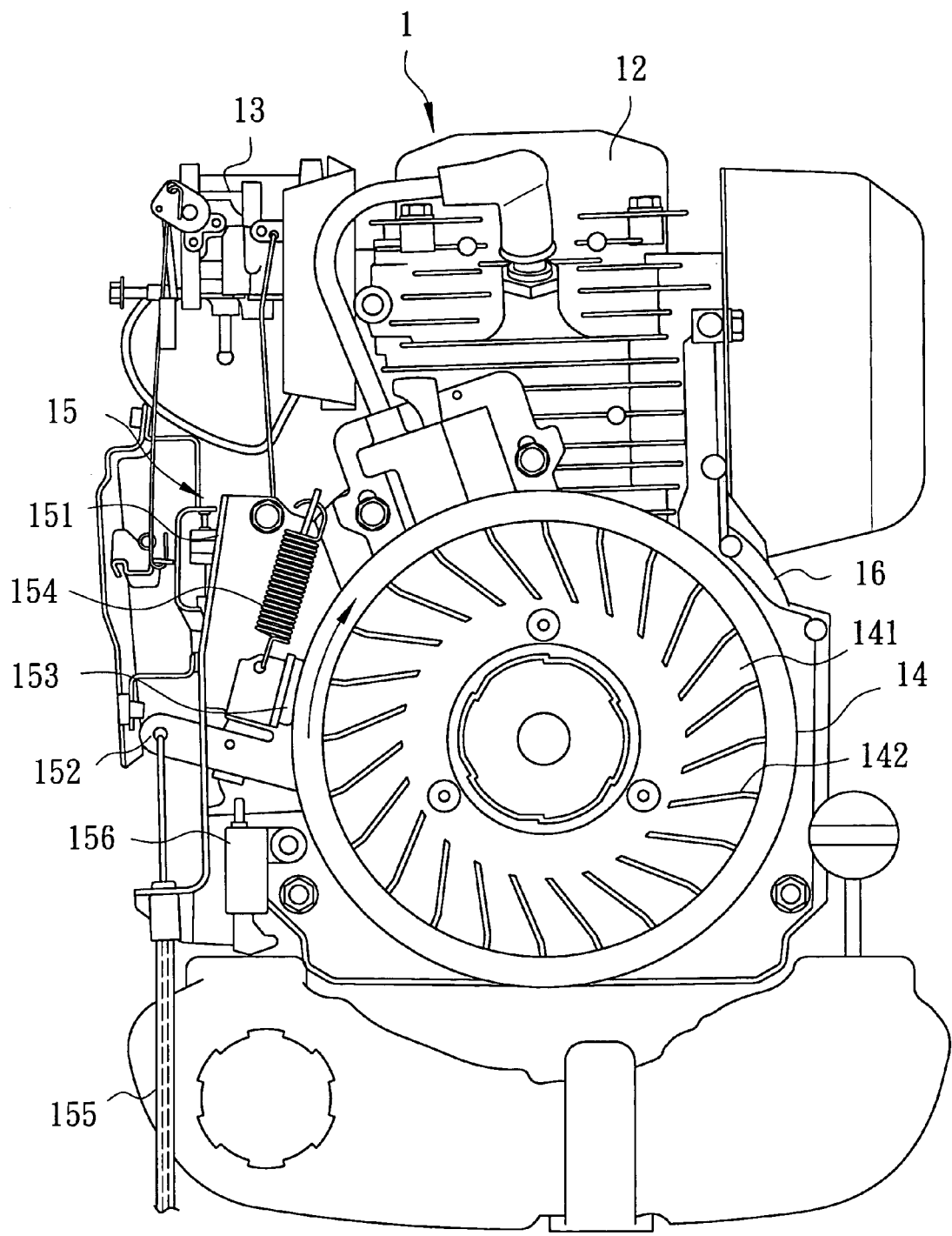
FIG. 2 is a schematic top view of the conventional lawn mower, illustrating how the flywheel is stopped by the brake device.
Figure 3:
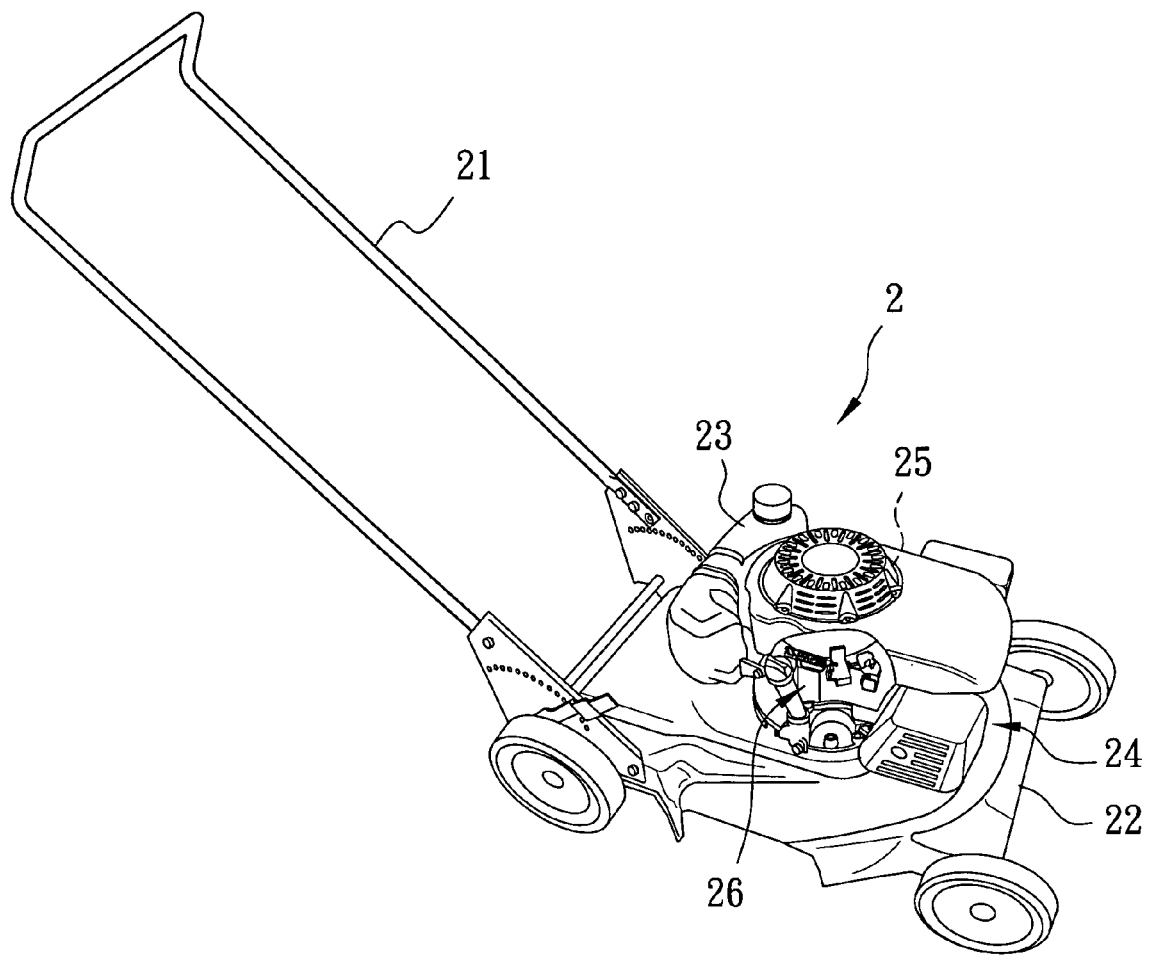
FIG. 3 is a perspective view of the preferred embodiment of a lawn mower according to this invention.
Figure 4:
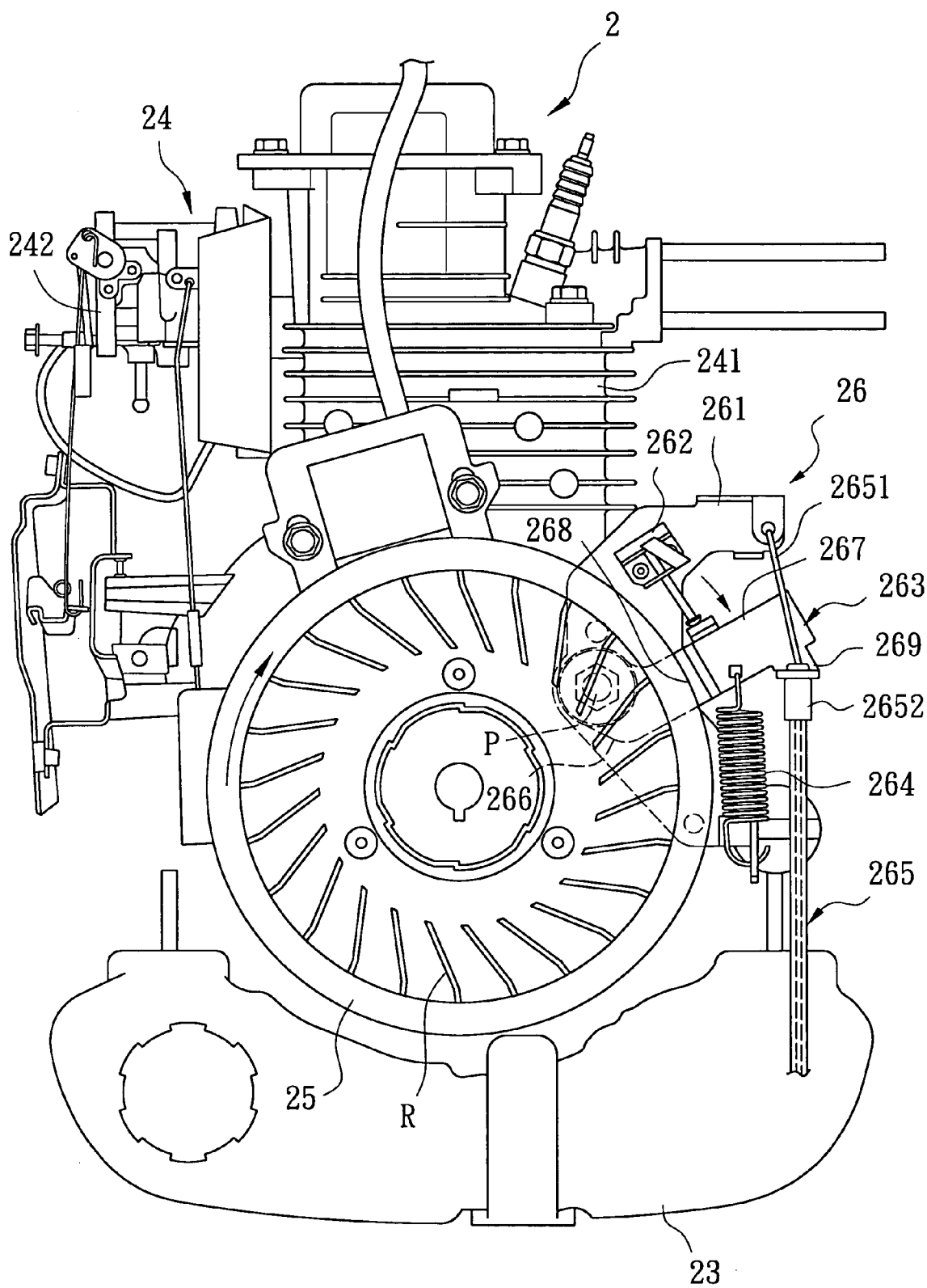
FIG. 4 is a schematic top view of the preferred embodiment, illustrating how a flywheel is stopped by a brake device.

Referring to FIGS. 3 and 4, the preferred embodiment of a lawn mower 2 according to this invention is shown to include a driving handle 21, a wheeled mower body 22, an oil tank unit 23 disposed on the mower body 22 for containing fuel (not shown), a driving device 24 disposed on the mower body 22, a flywheel 25 interposed between the driving device 24 and the oil tank unit 23, and a brake device 26 disposed adjacent to the flywheel 25.

The driving device 24 includes an engine 241 and an electrical element unit 242 disposed adjacent to the engine 241.

The flywheel 25 is rotatable on the mower body 22 in a clockwise direction, and has a side surface that is formed with a plurality of ribs (R), which are arranged such that the flywheel 25 functions as a fan for creating an air current flowing therearound. Thus, an annular airflow path is formed around the flywheel 25 so as to allow for dissipation of heat from the engine 241 and the electrical element unit 242 in an air-cooling manner.

Figure 5:
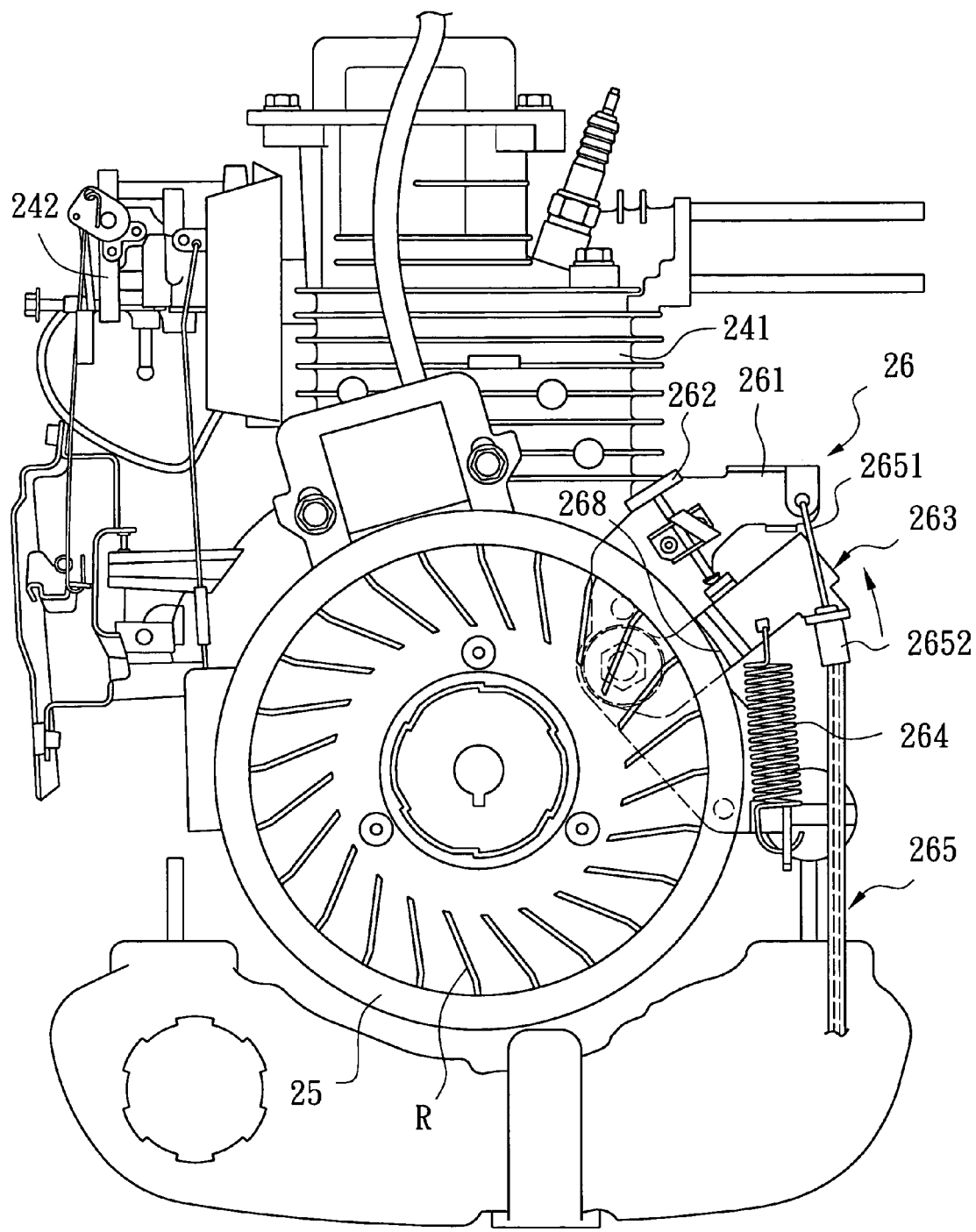
FIG. 5 is a schematic top view of the preferred embodiment, illustrating how the flywheel is released from the brake device.

The brake device 26 and the electrical element unit 242 are located respectively at two opposite sides of an assembly of the engine 241 and the flywheel 25. The brake device 26 includes a fixed frame 261, an electrically conducting member 262, a braking arm 263, a biasing member 264 in the form of a coiled tension spring, and a braking line unit 265. The fixed frame 261 is fixed on the mower body 22 in a known manner, and has a portion disposed under the flywheel 25. The conducting member 262 is disposed on the fixed frame 261, and is connected electrically to the engine 241 for supplying electricity to the engine 241. The braking arm 263 has a pivotal end 266 connected pivotally to the fixed frame 261 at a position under the flywheel 25 by a pivot pin (P), and a free end 267 with a braking shoe 268 secured thereto. The braking arm 263 is rotatable between a braking position shown in FIG. 4 and an ignition position shown in FIG. 5. The biasing member 264 interconnects the free end 267 of the braking arm 263 and the fixed frame 261 so as to bias the braking arm 263 to rotate clockwise, thereby pressing the braking shoe 268 of the braking arm 263 against a periphery of the flywheel 25. The braking line unit 265 includes a cable 2651 having an end fastened to the fixed frame 261, and a tube 2652 sleeved movably on the cable 2651 and fastened to an integral projection 269 of the free end 267 of the braking arm 263. The braking line unit 265 is operable to move the tube 2652 on the cable 2651 so as to bias the braking arm 263 to rotate counterclockwise against the biasing action of the biasing member 264 and into the ignition position.

When it is desired to perform the grass-cutting operation, a lever (not shown) on the driving handle 21 is operated to move the tube 2652 on the cable 2651. The tube 2652 pushes the projection 269 of the braking arm 263 against the biasing action of the biasing member 264 so as to rotate the braking arm 163 counterclockwise. Thus, the braking shoe 268 is removed from the periphery of the flywheel 25. This allows for rotation of the flywheel 25 on the mower body 22. When the braking arm 263 rotates to the ignition position shown in FIG. 5, the conducting member 262 supplies electricity to the engine 241, after which the engine 241 offers an output of mechanical energy for performing the grass-cutting operation.

Subsequently, when it is desired to stop the grass-cutting operation of the lawn mower 2, the lever (not shown) on the driving handle 21 is again operated so that the tube 2652 no longer applies a pushing force to the projection 269 of the braking arm 263. This causes the braking arm 263 to be pulled by the biasing member 264 to rotate clockwise to the braking position. Hence, electricity supply from the conducting member 262 to the engine 241 is stopped, and the braking shoe 268 is biased by the biasing member 264 to press against the periphery of the flywheel 25. Therefore, the operation of the engine 241 is discontinued.

The lawn mower 2 of this invention has the following advantages:

(1) Because the brake device 26 and the electrical element unit 242 are located respectively at the two opposite sides of the assembly of the flywheel 25 and the engine 241, the brake device 26 is remote from the electrical element unit 242, and therefore the generation of a turbulent airflow between the brake device 26 and the electrical element unit 242 and between the brake device 26 and the engine 241 is prevented. This allows for effective dissipation of heat from the electrical element unit 242.

(2) When sparks are produced between the brake device 26 and the flywheel 25 due to friction therebetween, they cannot approach the electrical element unit 242. This promotes the safety of the lawn mower 2.

With this invention thus explained, it is apparent that numerous modifications and variations can be made without departing from the scope and spirit of this invention. It is therefore intended that this invention be limited only as indicated by the appended claims.

We claim:

1. A power lawn mower comprising:
   a mower body;
   a flywheel rotatable on said mower body in a predetermined direction:
   a driving device disposed on said mower body and including an engine and an electrical element unit; and
   a brake device disposed on said mower body, said brake device and said electrical element untill being located respectively at two opposite sides of an assembly of said engine and said flywheel, said brake device including:
   a braking arm disposed pivotally on said mower body and rotatable on said mower body between a braking position and an ignition position,
   a braking shoe secured to said braking arm,
   a biasing member for biasing said braking arm to rotate toward said braking position in said predetermined direction so as to press said braking shoe against a periphery of said flywheel, and
   a conducting member disposed on said mower body and electrically connected to said engine so as to supply electricity to said engine when said braking arm is disposed in said ignition position, and so as to stop electricity supply to said engine when said braking arm is disposed in said braking position.

2. The power lawn mower as claimed in claim 1, wherein said flywheel has a side surface that is formed with a plurality of ribs, which are arranged such that said flywheel functions as a fan for creating an air current flowing therearound, thereby dissipating heat from said engine and said electrical element unit.

3. The power lawn mower as claimed in claims 1, wherein said brake device further includes a braking line unit connected to said braking arm and operable to rotate said braking arm in a direction opposite to said predetermined direction against biasing action of said biasing member so as to remove said braking shoe from said periphery of said flywheel, thereby permitting said braking arm to rotate to said ignition position.

4. The power lawn mower as claimed in claim 3, wherein said braking line unit includes a cable having an end fastened to said mower body, and a tube sleeved movably on said cable and having an end fastened to said braking arm, said tube being movable on said cable so as to rotate said braking arm to said ignition position.

* * * * *